United States Patent [19]

Raber

[11] 4,177,999

[45] Dec. 11, 1979

[54] INFINITELY ADJUSTABLE BEARING SEAL FOR NON-PARALLEL SURFACES

[75] Inventor: Harry M. Raber, York, Pa.

[73] Assignee: Allis-Chalmers Corporation, Milwaukee, Wis.

[21] Appl. No.: 941,085

[22] Filed: Sep. 11, 1978

[51] Int. Cl.² ............... F16J 15/06; F16B 43/02
[52] U.S. Cl. ........................ 277/112; 277/96.1; 277/130; 277/171; 277/190; 277/193; 85/1 JP; 85/50 C
[58] Field of Search ............. 277/112, 96.1, 117, 277/119, 125, 130, 126, 168, 170, 171, 190, 191, 193; 85/1 JP, 50 C, 50 AT

[56] References Cited

U.S. PATENT DOCUMENTS

| | | | |
|---|---|---|---|
| 774,042 | 11/1904 | Cooper | 85/50 AT UX |
| 960,899 | 6/1910 | Guyer | 85/50 C UX |
| 2,752,814 | 7/1956 | Iaia | 85/1 JP |
| 2,874,749 | 2/1959 | Brink | 85/50 C X |
| 3,016,248 | 1/1962 | Lindberg | 85/1 JP UX |
| 3,285,568 | 11/1966 | Biach | 85/50 AT X |
| 3,519,279 | 7/1970 | Wagner | 85/1 JP X |
| 3,796,437 | 3/1974 | Nickly | 277/190 X |

*Primary Examiner*—Robert S. Ward, Jr.
*Attorney, Agent, or Firm*—Robert C. Jones

[57] ABSTRACT

A pair of complementary tapered washers are engaged on a bolt that passes through a first member and is threadedly engaged in a second member; surfaces of the bolt head surface is not parallel to the surface which is to engage and a full bearing base is established by rotating each washer individually prior to tightening the bolt.

5 Claims, 2 Drawing Figures

INFINITELY ADJUSTABLE BEARING SEAL FOR NON-PARALLEL SURFACES

BACKGROUND OF THE INVENTION

In many machine installations, especially in installations wherein massive portions of the machines are fabricated machined separately such as in the case of hydraulic turbines, the stay ring is machined, drilled and tapped at one setup. At a later time the outer headcover is machined, spot faced and drilled to provide access openings for the insertion of bolts for joining the outer headcover to the stay ring. In these instances, it is not possible to line the outer headcover bolt hole with the tapped bolt opening in the stay ring. It is especially difficult to establish alignment between the bolt openings because they are located inside of the headcover where it is impossible for a drilling machine to have access and even with so-called portable drills there is no place to effect a clamping of the drilling machine. Thus, the drilled and tapped bolt hole in the stay ring must be formed separately from the bolt opening in the headcover. With this condition existing, it has been impossible to provide a complete flat mating engagement between the bearing face of the bolt head and a spot face on the headcover and provide a seal to prevent water leakage around the bolts and water would fill up the cavity in the headcover flooding the entire powerhouse chamber. Lead washers or similar deformable metallic material has been used below the bolt head but this has not proven successful since the lead washers flatten out on one side and split. Rubber has been tried but proven unsuccessful as it did not seal properly and would blow out through the opening.

DESCRIPTION OF THE INVENTION

Figure 1:
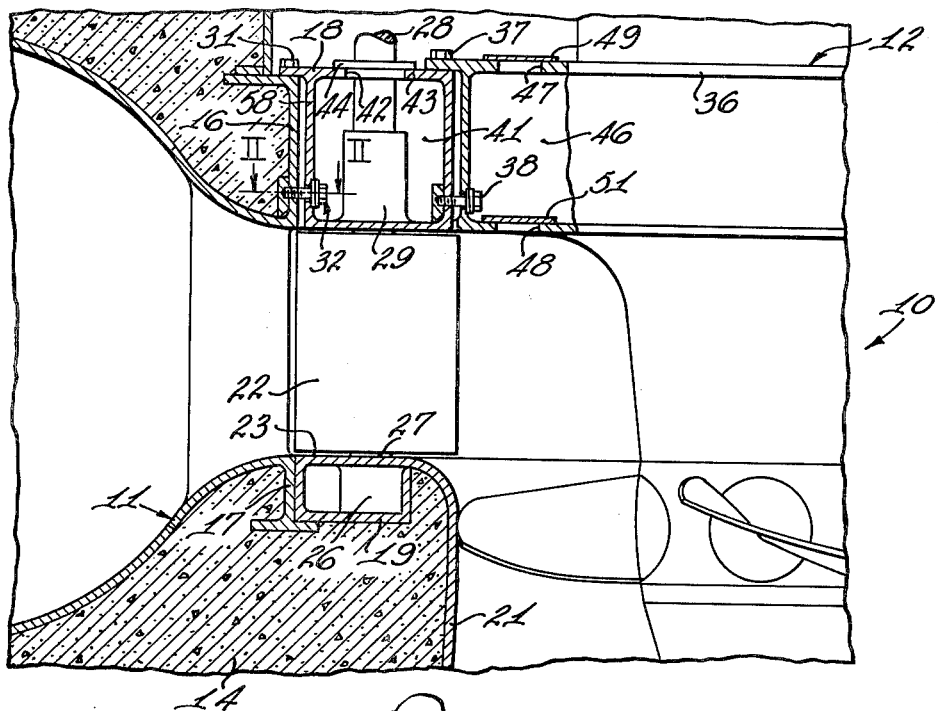
FIG. 1 is a fragmentary sectional view through a turbine showing the stay ring and head cover assembly in which the present invention is incorporated; and, FIG. 2 is an enlarged view of a bolt fastener joining the headcover to the stay ring and incorporating the present invention.

As shown in FIG. 1, a hydraulic turbine 10 includes a stay ring assembly 11 and a headcover assembly 12. The stay ring assembly 11 is fabricated separately from the headcover and usually cast into concrete turbine base 14 sometimes prior to the headcover 12 being attached. As shown, the stay ring 11 includes an upper and a lower circular flange portions 16 and 17 to which other portions such as the headcover 12 is attached.

The headcover assembly 12 includes an outer circular headcover 18 which in cross section is of box-like configuration. Below the outer cover and spaced therefrom is a circular discharge ring support portion 19 which in cross section is of box-like configuration. The discharge ring 21 is welded or integrally formed with the support portion 19. The assembly is casted in the concrete base 14 at the time that stay ring 11 is placed.

A plurality of wicket gates, one of which is depicted at 22, are disposed within the opening 23 formed between the bottom of the outer headcover 18 and the discharge ring support 19. The wicket gate 22 exemplifies all of the gates and each include a lower bearing 26 in which the lower portion 27 of the wicket gate shaft 28 is journalled. Within the outer headcover 18 there are a plurality of support bearings 29 in which the upper portion of the wicket gate shafts 28 is supported.

Securing of the outer headcover 18 in operative position is accomplished by bolting it to the upstanding circular flange portion 16 as by a plurality of tap bolts 31 and a plurality of inner side bolts 32. Secured to the outer headcover 18 is an inner headcover 36 which is shop fabricated and bolted as by a plurality of tap bolts 37 and a plurality of inner bolts 38.

In order to place the inner bolts 32 in operative position, access into the cavity 41 of the outer headcover 18 is provided by means of hand holes 42. The hand holes 42 are formed in the upper wall 43 of the outer headcover 18 and is closed by means of a removable cover 44. It is to be understood that a plurality of hand holes 42 are provided so as to provide access for inserting all of the bolts 32 in position. In a similar manner, access into the cavity 46 of the inner headcover 36 is provided by a plurality of upper and lower hand holes 47 and 48, respectively. The hand holes 47 and 48 being closed by covers 49 and 51.

As previously mentioned, the opening in the flange 16 of the stay ring 11 is drilled and tapped to a machine layout as at 56 prior to the stay ring 11 being encased in the concrete base 14. The complementary opening 57 in the sidewall 58 of the outer headcover 18 is also drilled to a machine layout some time later. In order to accomplish this, the opening 57 is drilled from the outside of the headcover. At this time, the inner surface of the wall 58 is spot faced as at 59 to provide a smooth surface. However, the spot face 59 is usually out of line with respect to the axis of the radial centerlines of both of the openings 56 and 57. In other words, the face surface 59 is not perpendicular to the radial axis of both of the holes 56 and 57. Thus, when the bolt 32 is inserted through the opening 57 into threaded engagement in the threaded opening 56 of the stay ring flange, the axis of the bolt 32 does not coincide with the axis of the opening 57 and a positive seal cannot be normally obtained between the head 61 of the bolt 32 and the spot face 59. If a seal is not obtained, the water under pressure passes from the wicket gate space 23 around the bolts 32 and through the opening 57 into the cavity 41 which is highly undesirable. The same condition obtains in connection with the bolts 38. Water leakage passing these bolts will flood the cavity 46 of the inner headcover. The exclusion of water from the headcover cavities 41 and 46 is necessary so as to prevent flooding of the powerhouse room.

Figure 2:
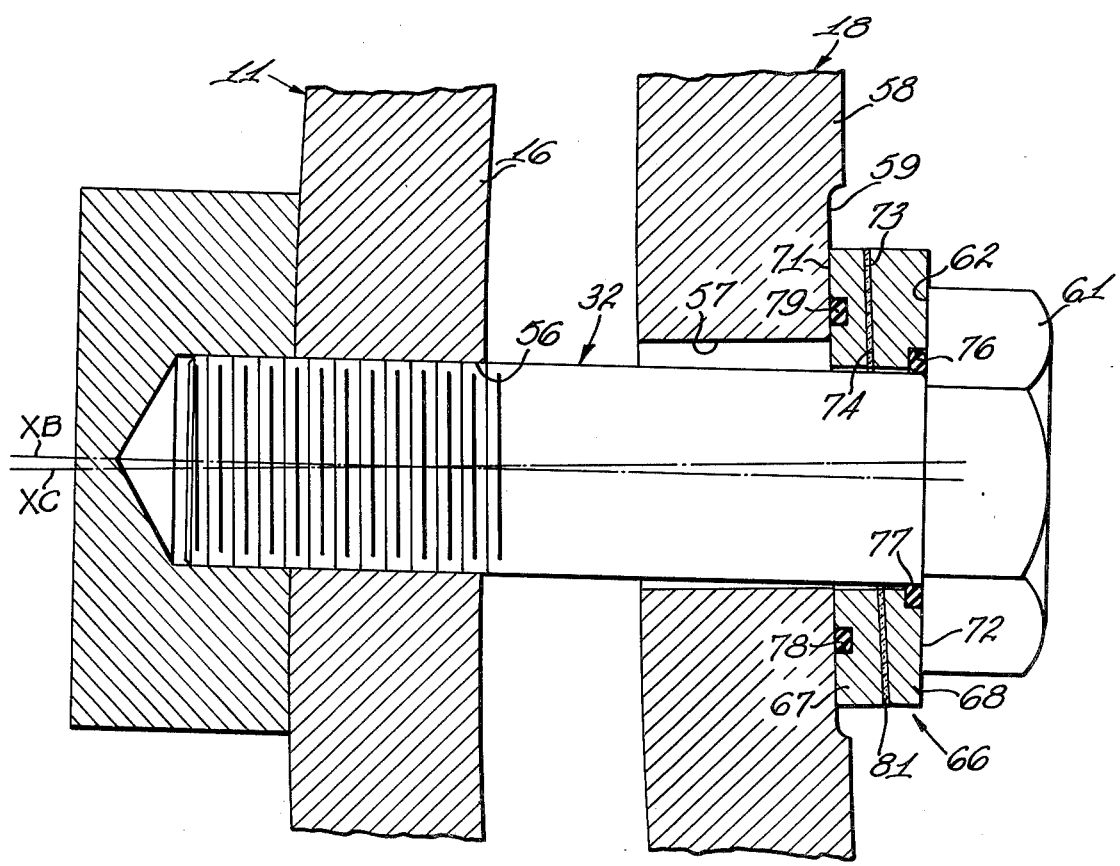

As shown in FIG. 2, the drilled and tapped bolt opening 56 in the stay ring 16 has an axis XB and the drilled bolt opening 57 in the headcover wall 58 has an axis XC. The axis XB and XC do not coincide for reasons previously set forth. Thus, when the bolt 32 is inserted through the opening 57 into threaded engagement in the opening 56, it's axis will coincide with the axis XB but not with the axis XC of the opening 57. As a result, the surface 62 of the bolt head 61 will not be parallel with spot face surface 59. With this condition, water under pressure will pass through the opening 57 around the bolt 32 and pass under the bolt head 61 to flood the headcover cavity 41.

To prevent water leakage through the opening 57 into the cavity 41, there is provided an infinitely adjustable wedge seal means 66 under the bolt head for sealing faces that are not perpendicular to the centerline or parallel to each other. As shown, the seal means 66 includes a pair of washers 67 and 68 which are mounted on the bolt 32. These washers are positioned between the face 62 of the bolt head 61 and the spot face surfaces 59. The washers 67 and 68 are identical and each present flat surfaces 71 and 72, respectively, which are at right angles to the axes of the openings in the washers. The opposite surfaces 73 and 74, respectively, of each of the washers 67 and 68 are formed so as to have a planar surface oblique to the axis of its respective opening in the washers. As is shown in FIG. 2, the surface 72 of the washer 68 is provided with a circular groove 76 in which a resilient member such as an O-ring 77 will effect a seal of the joint between faces 62 of the bolt head 61 and the surface 72 of the washer 68. In a similar manner, a circular groove 78 is formed in the surface 71 of the washer 67 and receives an O-ring 79 which serves to seal the joint between the surface 71 of washer 67 and the spot face surface 59 of the wall 58 of the headcover. Thus, as the bolt 32 is tightened, the washers 67 and 68 may be rotated individually to establish parallel bearing surfaces. In this manner, the non-parallel surfaces 59 and 62 are compensated for. By rotating the tapered washers any condition between the surfaces 59 and 62 from parallel to twice the taper on each washer out of parallel can be corrected. A sealing gasket or compound 81 is inserted between the washers 67 and 68.

The embodiments of the invention in which an exclusive property or privilege is claimed are defined as follows:

1. Apparatus for sealing the opening in a first member which is to be secured to a second member by a fastener having a bearing surface which is not parallel to the bearing surface of the first member with which it must engage;
    an infinitely adjustable wedge seal means surrounding the fastener and interposed between the bearing surface of the fastener and the bearing surface of the first member;
    whereby the infinitely adjustable wedge seal means can be adjusted to provide full bearing with which the bearing surface of the fastener can fully engage with and thereby seal the opening between said adjustable wedge seal means and the fastener.

2. Apparatus according to claim 1 wherein said infinitely adjustable wedge means includes;
    a first means having an axis mounted on the fastener;
    a first planar surface formed on said first means transverse to its axis and positioned to be engaged by the bearing surface of the fastener;
    a second means having an axis mounted on the fastener;
    a first planar surface formed on said second means transverse to its axis and positioned to engage with the second member;
    a second planar surface on said first member oblique to it's axis;
    a second planar surface on said second member oblique to it's axis, said oblique planar surfaces being positioned in facing relationship to engage with each other; and,
    whereby individual rotation of said first and second means relative to each other will operate to provide a normalized bearing surface on which the fastener can act to secure the first member in position to the second member and seal the opening in the first member to prevent leakage around the fastener.

3. Apparatus according to claim 2 wherein said fastener is a threaded bolt having a head portion presenting a flat bearing surface which is transverse to it's axis but not parallel with the surface it is to engage;
    said first means being a first washer having an axial opening therein to receive the bolt;
    said first planar surface formed on said first means being a flat surface formed on said first washer in a plane transverse to the axis of the opening in said washer and positioned to be engaged by the bearing surface on the head portion of said bolt;
    said second means being a second washer having an axial opening to receive the bolt;
    said first planar surface formed on said second means being a flat surface formed on said second washer in a plane transverse to the axis of the opening therein and positioned to engage with the bearing surface of the first member;
    said second planar surface on said first member being a flat sloping surface formed on said second washer; and,
    said second planar surface on said second member being a flat sloping surface formed on said second washer complementary to the flat sloping surface formed on said first washer, said flat sloping surfaces being arranged in facing relationship to engage each other;
    whereby individual rotation of said first and second washer relative to each other will establish a bearing surface which the flat bearing surface on the head portion of said bolt can fully engage with and also effect a seal of the opening in said first washer through which the bolt extends.

4. Apparatus for sealing the opening in a first member which is to be secured to a second member by a threaded bolt having a bearing surface which is not parallel to the bearing surface of the first member with which it must engage;
    a first tapered washer;
    a second tapered washer complementary to said first tapered washer;
    said tapered washers being engaged in said bolt between the bearing surface of said bolt and the bearing surface of the first member;
    said tapered washers each being sized to accommodate a condition between the non-parallel surfaces from parallel to twice the taper of each washer out of parallel.

5. Apparatus according to claim 3 wherein there is provided a resilient seal interposed between the bearing surface of the head portion of said threaded bolt and said first planar surface on said first washer;
    a resilient seal interposed between said first planar surface on said second washer and the bearing surface of said first member; and,
    sealing means being the complementary sloping surfaces of said first and second washers.

* * * * *